United States Patent Office 3,125,044
Patented Mar. 17, 1964

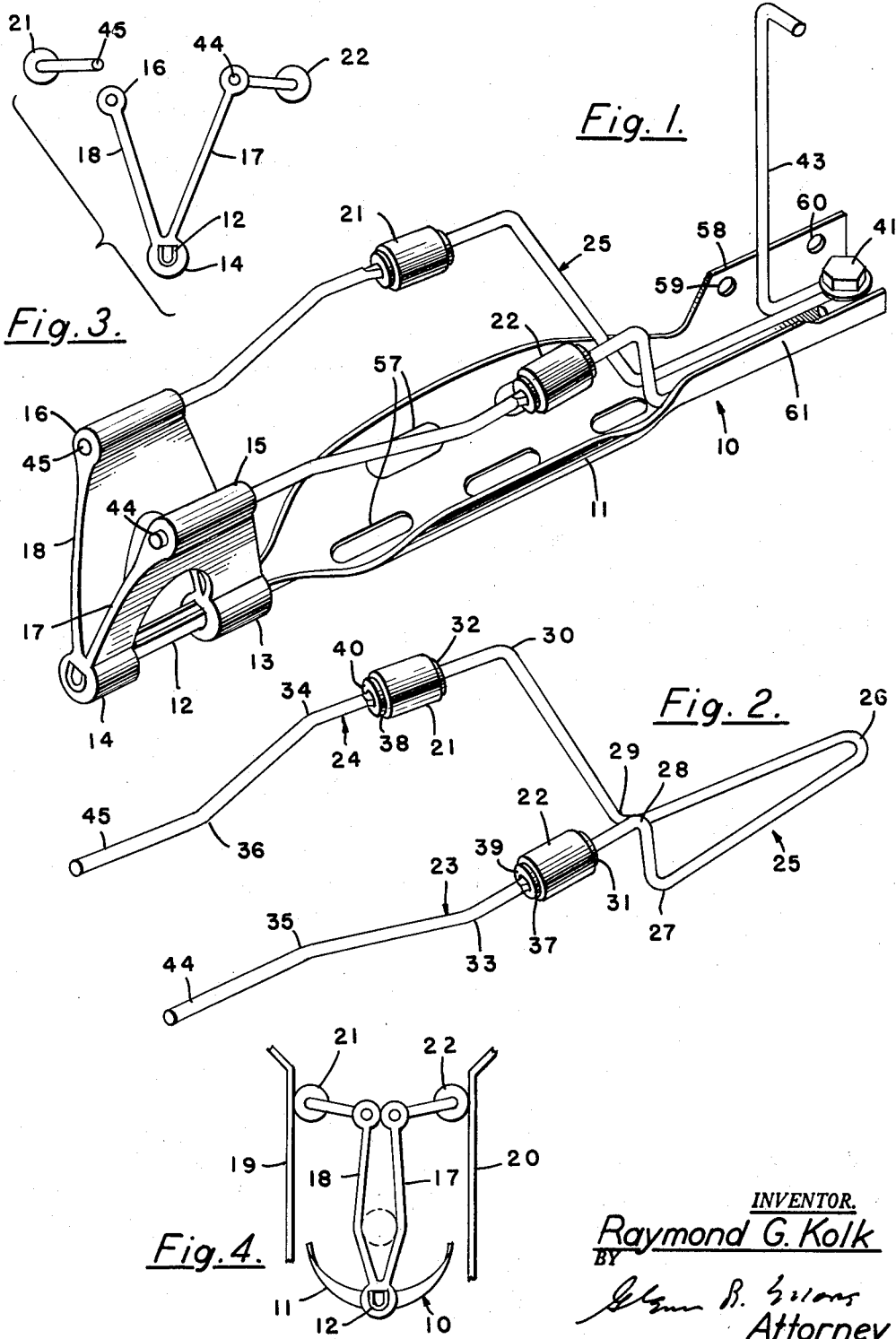

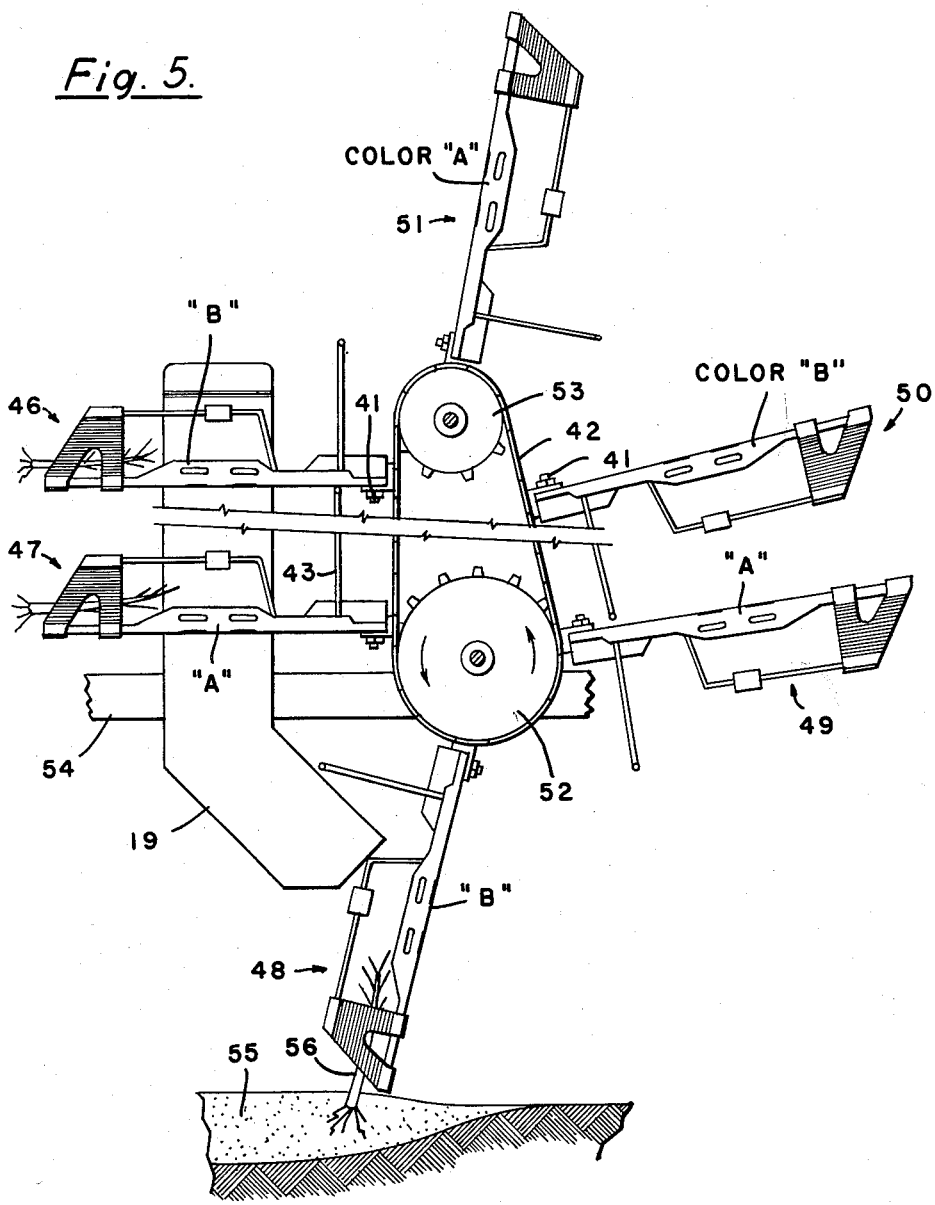

3,125,044
PLANT-CARRYING ARM FOR TRANSPLANTING
MACHINE
Raymond G. Kolk, 65 W. 27th St., Holland, Mich.
Filed July 3, 1961, Ser. No. 121,693
4 Claims. (Cl. 111—2)

This invention relates to the construction of transplanting machinery, and particularly to the mechanism of the carrying arm used to place the plants in position in the furrow. This general type of machine is discussed in United States Patents Nos. 653,298, 1,765,469, 2,216,923, 2,739,548 and others.

It is conventional to mount a group of plant-carrying arms to extend laterally from a conveyor chain, or on a wheel hub to extend radially in the manner of spokes. This assembly is mounted on a carrying vehicle, with suitable power transfer means utilized to move the arms as a function of the forward movement across the ground. A plow or other furror-opening device is located in advance of the planting position; and the function of the arms is to grasp the plants at a loading station, carry them to planting position, and release them as the furrow is closed around them. Normally, a pair of operators sits side-by-side on the vehicle, and feeds plants to the arms alternately as the planting operation proceeds.

The effectiveness of these planting machines is largely determined by the operation of the planting arms. The grasping and release action must be gentle but positive, and the forces required to operate the arm should not induce vibration or oscillation in the machine. The number of arms on each machine dictates that the mechanism be as simple and inexpensive as possible, and the conditions of use require that the components be rugged and able to function well without constant repair and readjustment.

The arm assembly provided by this invention is of the double-opening type shown in U.S. Patent No. 653,298, wherein opposite flexible flaps form a V-shaped configuration which opens and closes from both sides to receive and release the plants. The present invention uses a novel mechanism for controlling these flaps, and provides a very inexpensive group of components having a positive easily-powered action which includes a natural biasing effect to the open position. Hinged elements and other relatively movable joints are eliminated, and a gentle force is applied to maintain the desired degree of tension on the flaps. In the preferred form of the invention, all this is accomplished by a single piece of bent rod that is secured by a fastening required for other purposes also. The action responsible for positioning the flaps is achieved principally by a deflection of the rod material, with this deflection being responsible for the spring action referred to above. The structural strength of the arm assembly which causes it to extend in cantilever relationship from the moving mechanism is contributed by a beam having a cross-section providing a receptacle for receiving the foliage portion of the plant. The flap-controlled mechanism is formed in the configuration which provides substantial clearance over the plants on the receptacle to avoid damaging them.

The several features of the invention will be analyzed in detail through a discussion of the particular embodiments illustrated in the accompanying drawings. In the drawings:

FIGURE 1 illustrates a perspective view of a plant-carrying arm assembly embodying this invention.

FIGURE 2 presents a view of the flap-positioning device.

FIGURE 3 is a schematic illustration showing the application of tension to the flexible flaps by the device shown in FIGURE 2.

FIGURE 4 illustrates the operation of cam plates in engagement with the flap-positioning assembly to apply a grasping action to the plants.

FIGURE 5 illustrates a view in side elevation of the plant-carrying structure of a transplanting machine, showing the successive positions of the various carrying arms.

Referring to FIGURE 1 and the related views, the arm assembly includes the channel-shaped beam generally indicated at 10 having an enlarged trough-shaped central portion 11 to serve as a receptacle for the foliage of the plants. At the outer extremity of the beam 10, a projection 12 is provided to receive the central portions 13 and 14 of a flexible flap. It is conventional to construct such a flap out of a piece of extruded material which is cut to form the illustrated configuration. The grasping action responsible for holding the plants involves a movement of the upper portions 15 and 16 of the flaps toward each other to close the angle formed by the flap, with the stem of the plant entrapped in the position shown in dotted lines in FIGURE 4. In this position, the sides 17 and 18 of the flap apply a very gentle grasping action to the plant which is adequate to hold it in place, and yet not severe enough to cause damage.

The mechanism responsible for closing the flaps to the grasping position shown in FIGURE 4 includes the cam plates 19 and 20 which are normally fixed with respect to the vehicle. These plates extend over that portion of the total travel of the arms at which it is desirable to maintain the grasping action, this distance being from the loading station to the point of release. The rollers 21 and 22 are preferably included to facilitate the application of forces from the plates 19 and 20 to the arms 23 and 24 of the resilient member 25 which serves to position the sides of the flap. This piece is preferably formed of bent steel rod, the initial configuration prior to assembly being illustrated in FIGURE 2. The successive bends indicated at 26–30 can be applied to the rod material prior to the installation of the rollers 20 and 21. Preferably the washers 31 and 32 are inserted from the left (as shown in FIGURE 2) prior to the completion of the bends 33–36, with the rollers 21 and 22 and the washers 37 and 38 being applied in proper sequence. Suitable staking operations at the opposite sides of the rollers (as shown at 39 and 40) will serve to locate the rollers in both directions along the arms 23 and 24. The securing of the member shown in FIGURE 2 with respect to the beam 10 is accomplished entirely by the presence of the bolt 41, which is also used to secure the beam to the conveyor chain 42, as shown in FIGURE 5. The member 43 is conventional in machinery of this type, and limits the degree of articulation of the arm assembly with respect to the chain through engagement with the adjoining arm assembly.

Following the application of the bolt 41, or prior thereto, as may be desired, the ends 44 and 45 of the member shown in FIGURE 2 are engaged in the appropriate openings in the ends 15 and 16 of the flaps. The rod member is preferably formed with a natural tendency to incline upwardly from the fully assembled position so that it becomes necessary to pull the arms downward in order to engage them with the flap ends 15 and 16. This type of deflection applies a gentle spring action tending to hold the flaps in a radial position with respect to the projection 12 with a desired degree of tension depending upon the amount of deflection which must be applied to the ends 44 and 45 in order to accomplish the insertion. This relationship is shown in FIGURE 3, in which the end 44 has been inserted, with tension resulting in the flap side 17. As the end 45 is depressed and engaged in the flap end 16, the side 18 will assume the same general relationship as is illustrated on the side 17. FIGURE 3 is somewhat exaggerated in the degree of elongation applied to the flap sides, in order to illustrate this feature.

The entrance of the rollers 21 and 22 between the plates 19 and 20 results in a movement of the rollers toward each other, and a consequent closing of the flap to the position shown in FIGURE 4. This deflection is accomplished by a deflection in the material of the member illustrated in FIGURE 2 between the rollers 21 and 22 and the loop bend 26.

Referring to FIGURE 5, a group of successive plant-carrying arm assemblies indicated at 46–51 are mounted on the chain 42 positioned by the sprockets 52 and 53, which are conventional components of a transplanter machine of this type. This assembly is mounted upon the chassis generally indicated at 56, which is also conventional. This loading station may be identified as the position of the arm assembly 46 prior to the engagement of its rollers with the cam plates 19 and 20. The plants are placed manually in engagement with the flaps as the flaps are closed by the cam plates. The release position is shown by the position of the arm assembly 48, and it is conventional to have a furrow-closing device (not shown) as a standard component of this type of vehicle for closing the furrow indicated at 55 around the roots of the plant 56 as the plant is released by the carrying arm assembly.

To facilitate the use of this equipment on standard vehicles, applicant has found that it is desirable to apply a distinctive color to the beams 10 of the successive arm assemblies. One of such beams may be identified by a color "A," and the beam immediately following by a color "B." The colors are therefore alternating, and the operators on one side may apply his plants to the beams of one particularly color as they move past him. In this manner, there will be no confusion between the operators as to which one is to apply a plant to a particular arm. This simple expedient has been found to substantially reduce the amount of required attention. Anything tending to reduce the probability of human error will obviously increase the value of the machine.

The preferred arrangement of the components is best shown in FIGURE 1, and the spread between the rollers 21 and 22 fully exposes the central part 11 of the beam 10 for receiving the plants. It is preferable that perforations as shown at 57 be incorporated to facilitate the movement of particles of dirt so that they do not build up and create a problem as the machine proceeds under continuous use. The broad expanse of the receptacle portion 11, with its characteristic color associated with an operator at one side of the machine, provides an effective guide and a target for the placement of the plants. This same general type of arm assembly can as well be incorporated in a wheel-type transplanting machine of conventional construction. On such an arrangement, the flange 58 is bolted to the wheel at the holes 59 and 60, and this arrangement permits the completely assembled arm unit to be installed on either type of machine. The flanges 58 and 61 may be used as limit stops to the resilient lateral deflection to the sides of the member 25 adjacent the loop bend 26, in addition to providing structural strength as a cantilever beam.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. In combination with a planting machine having conveying means establishing a path of movement from a loading position to a planting position, and also having spaced cam plates adjacent said conveying means and substantially parallel to the path of movement thereof, a plurality of plant-carrying arms mounted on said conveying means, each of said arms comprising: a beam extending from said conveying means for movement therewith on a path disposed between said cam plates, said beam having a trough-shaped perforated central portion of increased width; a bolt securing said beam to said conveying means; a unitary resilient actuator member including a rod having a loop engaging said bolt and rigidly secured to said beam, said actuator member having the opposite sides of said loop extending transversely offset from said beam and normally spaced on opposite sides beyond the path of movement of said beam, and said actuator member having spaced ends; and a V-shaped gripping member of flexible material having a portion at the apex thereof engaging said beam, and also having holes at the side extremities thereof engaging the ends of said actuator member, said cam plates serving to bring the opposite sides of said actuator member together in resilient deflection of the material of said actuator member over predetermined portions of the path of movement thereof to close said gripping member, the beams of successive arms on said conveying means being of alternate colors in succession.

2. In combination with a planting machine having conveying means establishing a path of movement from a loading position to a planting position, and also having spaced cam plates adjacent said conveying means and substantially parallel to the path of movement thereof, a plurality of plant-carrying arms mounted on said conveying means, each of said arms comprising: a beam having a channel-shaped cross-section extending from said conveying means for movement therewith on a path disposed between said cam plates; bolt means securing said beam to said conveying means and traversing the back portion of said channel-shaped cross-section; a resilient actuator member including a rod having a loop engaging said bolt means, rigidly secured to said beam and disposed within said channel-shaped cross-section, said actuator member having the opposite sides of said loop extending transversely offset from said beam and normally spaced on opposite sides beyond the path of movement of said beam; and a V-shaped gripping member of flexible material having a portion at the apex thereof engaging said beam, and also having holes at the side extremities thereof engaging the ends of said actuator member, said cam plates serving to bring the opposite sides of said actuator member together over predetermined portions of the path of movement thereof in resilient deflection of the material of said actuator member to close said gripping member.

3. In combination with a planting machine having conveying means establishing a path of movement from a loading position to a planting position, and also having spaced cam plates adjacent said conveying means and substantially parallel to the path of movement thereof, a plurality of plant-carrying arms mounted on said conveying means, each of said arms comprising: a beam secured to and extending from said conveying means for movement therewith on a path disposed between said cam plates; a resilient actuator member including a rod having a loop rigidly fixed with respect to said beam, said actuator member having the opposite sides of said loop extending transversely offset from said beam and normally spaced beyond opposite sides of the path of movement of said beam; and a V-shaped gripping member of flexible material having a portion at the apex thereof engaging said beam, and also having holes at the side extremities thereof engaging the ends of said actuator member, said cam plates serving to bring the opposite sides of said actuator member together over predetermined portions of the path of movement thereof in resilient deflection of the material of said actuator member to close said gripping member.

4. In combination with a planting machine having conveying means establishing a path of movement from a loading position to a planting position, and also having spaced cam plates adjacent said conveying means and substantially parallel to the path of movement thereof, a plurality of plant-carrying arms mounted on said conveying means, each of said arms comprising: a beam secured to and extending from said conveying means for movement therewith on a path disposed between said cam plates; a resilient actuator member having portions at one end rigidly fixed with respect to said beam, said actuator member having intermediate portions transversely offset from said beam and normally spaced on opposite sides beyond the path of movement of said beam, and said actuator member having spaced ends; and a V-shaped gripping member of flexible material having a portion at the apex thereof engaging said beam, and also having holes at the sides extremities thereof engaging the ends of said actuator member, said cam plates serving to bring the opposite sides of said actuator member together over predetermined portions of the path of movement thereof in resilient deflection of the material of said actuator member to close said gripping member.

References Cited in the file of this patent

UNITED STATES PATENTS

| | | |
|---|---|---|
| 986,145 | Davis | Mar. 7, 1911 |
| 1,026,492 | Bruhn | May 14, 1912 |
| 2,739,548 | Poll | Mar. 27, 1956 |
| 2,853,962 | Cease | Sept. 30, 1958 |
| 2,959,141 | Wilson | Nov. 8, 1960 |
| 2,960,944 | Poll | Nov. 22, 1960 |
| 2,975,936 | Rousek | Mar. 21, 1961 |